US009847998B2

United States Patent
Blinn et al.

(10) Patent No.: US 9,847,998 B2
(45) Date of Patent: Dec. 19, 2017

(54) SYSTEM AND METHOD FOR DELEGATION OF PERMISSIONS TO A THIRD PARTY

(71) Applicant: Go Daddy Operating Company, LLC, Scottsdale, AZ (US)

(72) Inventors: Arnold Blinn, Hunts Point, WA (US); Michael S. Bovich, Chandler, AZ (US); Judd Conrad Jacobs, San Jose, CA (US); Jake Plains, Phoenix, AZ (US); Ian Schiffer, Scottsdale, AZ (US); Lu Wang, Mountain View, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 287 days.

(21) Appl. No.: 14/719,211

(22) Filed: May 21, 2015

(65) Prior Publication Data

US 2016/0344735 A1    Nov. 24, 2016

(51) Int. Cl.
*H04L 29/06* (2006.01)

(52) U.S. Cl.
CPC .................. *H04L 63/10* (2013.01)

(58) Field of Classification Search
CPC ...................................... H04L 63/10
USPC ............................................. 726/4
See application file for complete search history.

(56) References Cited

U.S. PATENT DOCUMENTS

| 7,412,720 B1 * | 8/2008 | Frey ............... H04L 63/168 707/E17.032 |
| 9,450,958 B1 * | 9/2016 | Saylor ............... G06F 21/45 |
| 2003/0204610 A1 * | 10/2003 | Howard ........... G06F 21/31 709/229 |
| 2013/0066750 A1 * | 3/2013 | Siddique ........ G06Q 10/0637 705/27.2 |

* cited by examiner

*Primary Examiner* — Brandon Hoffman
*Assistant Examiner* — Samuel Ambaye
(74) *Attorney, Agent, or Firm* — Quarles and Brady

(57) ABSTRACT

A system and method for delegating permissions to a third party are presented. A request to access a first computing resource of a computer server is received from a first user. The first user is prompted to supply a first authentication credential for access to the first computing resource of the computer server and the first authentication credential is received from the first user. After the first authentication credential is received, a request to access a second computing resource of the computer server is received from the first user. An authentication database is accessed to identify a second user associated with the second computing resource, and a request for a second authentication credential is transmitted to a second user. The second authentication credential is received from the second user. When the second authentication credential is received from the second user, the first user is given access to the second computing resource.

20 Claims, 12 Drawing Sheets

Put your brand on it

You've worked hard to create your brand.
We'll make sure it's always shown in the best light.

● ○ ○

202

204 — Jasper Bern

206

208 — jasper@nextgensolutions.com

210 — (312) 325-2213

212 — That's my brand (You can change this at any time.)

Things you need to know

Emails with a Face
Your beautiful logo gets slapped on
all emails and communiques.

You're the Hero
Clients see "your" brand (not just
GoDaddy's) at every turn.

ADD A CLIENT
Start managing client purchases and products.

FIRST NAME   LAST NAME

EMAIL ADDRESS

SEND PRODUCTS (OPTIONAL) — 401

- ADD PRODUCTS

FINISH

SUSAN JONES
susan@gmail.com  Access: None

PRODUCTS

Account access pending.
You'll see Susan's products as soon as they grant you access.

RE-SEND REQUEST

Give account access

Enter a name and email address for the person you'd like to grant account access. Then, select an access level, add a personal message, and click Grant Access.

Name

Jasper Bern

Email jasper@nexgensolutions.com

Access level *

- ◉ Working
  User has access to products you've purchased
  Learn more

- ○ Working + Purchasing
  User has access to your products and purhasing rights using your stored payment information
  Learn more Optional message for recipient

[ Grant Access ]   Cancel

FIG. 7C

SYSTEM AND METHOD FOR DELEGATION OF PERMISSIONS TO A THIRD PARTY

FIELD OF THE INVENTION

The present invention generally relates to the field of permission delegation and, specifically, to systems and methods for delegating permissions to a developer for maintaining and updating a web presence.

The present invention generally relates to the field of permission delegation and, specifically, systems and methods for delegating permissions to a developer for maintaining and updating a web presence.

SUMMARY OF THE INVENTION

The present inventions provide systems and methods comprising one or more server computers communicatively coupled to a network.

In one embodiment, a method includes receiving, by a computer server configured to communicate via a communications network and from a first user, a request to access a first computing resource of the computer server, prompting, by the computer server, the first user to supply a first authentication credential for access to the first computing resource of the computer server, and receiving, by the computer server, the first authentication credential from the first user. The method includes, after receiving, by the computer server, the first authentication credential, receiving, from the first user, a request to access a second computing resource of the computer server, accessing, by the computer server, an authentication database to identify a second user associated with the second computing resource, transmitting, by the computer server, to the second user a request for a second authentication credential, and, when the second authentication credential is received from the second user, granting, by the computer server, the first user access to the second computing resource.

In another embodiment, a method includes receiving, by a computer server configured to communicate via a communications network and from a first user, a request to access a computing resource of the computer server, accessing, by the computer server, an authentication database to identify a second user associated with the computing resource, and transmitting, by the computer server, to the second user a request for an authentication credential. The method includes receiving, by the computer server, from the second user the authentication credential.

In another embodiment, a system includes an authentication database associating at least one user with at least one computing resource and a computer server configured to communicate with the authentication database. The computer server is configured to receive, from a first user, a request to access a computing resource, access the authentication database to identify a second user associated with the computing resource, transmit, to the second user, a request for an authentication credential, and receive, from the second user, the authentication credential.

In another embodiment, a method includes receiving, by a computer server configured to communicate via a communications network and from a first user, an electronic communication encoding a listing of products that are available for purchase. The electronic communication identifies a second user. The method includes storing, by the computer server, the listing of products in a database in association with a key, accessing, by the computer server, a user accounts database to determine whether the first user is a delegate of the second user, and, when the user accounts database contains a record indicating that the first user is a delegate of the second user, the computer server:

In another embodiment, a method includes receiving, by a computer server configured to communicate via a communications network and from a first user, an electronic communication encoding a listing of products that are available for purchase. The electronic communication identifies a second user. The method includes storing, by the computer server, the listing of products in a database in association with a key, encoding, by the computer server, the key into a link in a second electronic communication configured for display on a client device, and transmitting, by the computer server, the second electronic communication to the second user identified in the first electronic communication, the second electronic communication identifying the first user.

In another embodiment, a system includes a database configured to store at least one listing of products in association with at least one key, and a computer server. The computer server is configured to receive, from a first user, an electronic communication encoding a listing of products that are available for purchase. The electronic communication identifies a second user. The computer server is configured to store the listing of products in the database in association with a key, encode the key into a link in a second electronic communication configured for display on a client device, and transmit the second electronic communication to the second user identified in the first electronic communication. The second electronic communication identifies the first user.

The above features and advantages of the present invention will be better understood from the following detailed description taken in conjunction with the accompanying drawings.

BRIEF DESCRIPTION OF THE DRAWINGS

FIG. 2 is a screenshot illustrating an example user interface that may be used by a developer to register as a developer with a host.

FIGS. 7A-7C are screen shots depicting various steps in a method for a developer to shop for products for a client.

DETAILED DESCRIPTION

Figure 1:
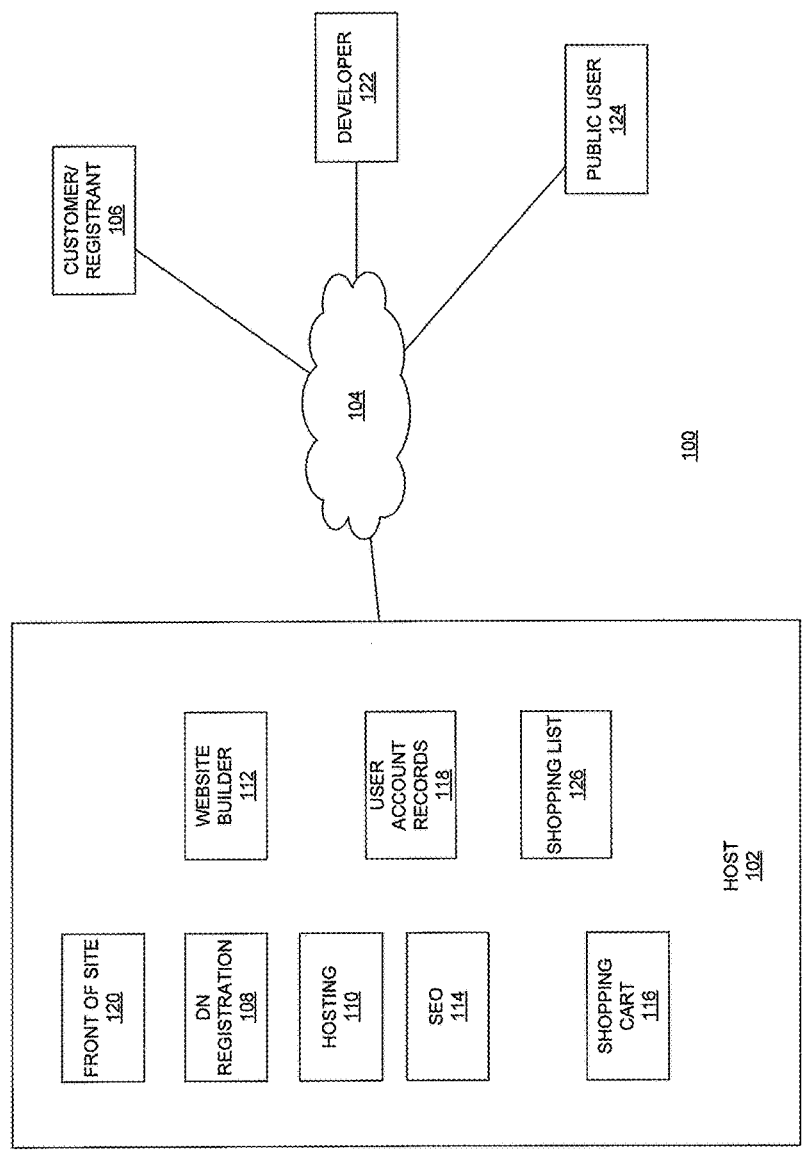
FIG. 1 is a block diagram illustrating an environment in which aspects of the present invention may be implemented.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

In a number of situations a domain name registrant will work with a developer to create and maintain the registrant's online web presence. This may involve working with a web developer to register a domain name and create a corresponding website and manage and maintain content that is present on the website. The web developer may be an entity that includes professionals well versed in website programming languages, as well as copy writing and visual or graphic design. The developer may also offer other services, such as social media management, which may involve monitoring and distributing content through one or more social media networks using accounts affiliated with the registrant. Where the registrant is a small business, for example, this may involve interacting with the business' customers to answer queries and provide assistance.

When developing the registrant's website, the developer may be relied upon to build the registrant's primary website, as well as implement a number of technologies that are operated in association with that primary website. For example, if the registrant is a small business and offers products and/or services for sale through its website, the developer may be relied upon to implement a shopping cart functionality on the website enabling customers of the website to browse available products and services and then purchase the same. In a similar fashion, the developer may be relied upon to implement an accounting software system for such a small business.

In conventional arrangements, it can be difficult for a domain name registrant to work effectively with a third party developer. In the relationship, the developer is generally the expert and has a better understanding of what tools, products and services the registrant needs to develop their online presence. Even so, the registrant is generally tasked with purchasing those tools, products, and services based upon the developer's recommendations. In some cases, the purchase process for such products can be complicated and technical requiring the registrant to select between options and features with which the registrant may not be familiar. For example, when purchasing hosting services, the registrant may be required to select between options providing varying amounts of storage capacity, bandwidth, peak bandwidth, and the like. Hosting services may also be provided using a number of different underlying operating systems and web servers, which themselves may include different purchase options for installed modules enabling different functionality. Similarly, when purchasing search engine optimization (SEO) services, purchase options may include the selection of potential keywords at different costs, and one or more search engines upon which to implement the SEO services.

As such, the product purchase process may often involve the registrant being unable to confidently select between the one or more options available for a particular product. As a consequence, the registrant may be reduced to calling or meeting with the developer in person so that the correct selections can be made and the products purchased. Of course, this wastes valuable time and money, requires additional communications between the developer and registrant, and can create frustration. This is particularly true in the instance that the registrant makes an incorrect selection and either purchases the wrong tool, product, or service.

In many cases, this complexity has resulted in a number of domain name registrants simply handing over a credit card or other payment instrument to a developer enabling the developer to purchase required products and services on behalf of the registrant. Of course, this option presents a number of difficulties, too. First, there is no constraint to what the developer is able to purchase with the payment device provided by the registrant. Even perfectly innocently, a miscommunication between registrant and developer could lead to the developer purchasing unwanted products or services, or selecting options associated with the products or services that make them more expensive than desired by the registrant.

Furthermore, once the products or services have been purchased, the developer must find some way to transfer ownership of the purchased products and services back to the domain name registrant. This often requires that the developer configure the purchased products or services with passwords known to the registrant or provided to the registrant after the products and/or services are purchased. Again, this can be quite cumbersome.

Even after the products or services are purchased, the developer may require ongoing access to the products or services so as to configure them in accordance with the registrant's wishes. This usually requires that the registrant and developer share account details (e.g., username and password) enabling both parties to access the products or services. As the password must be shared between the parties, the password is usually arbitrary and prone to being lost or forgotten. In many cases, the registrant, being too unsophisticated to modify the account credentials for the product or services, will simply continue using the same username and password, meaning that the developer may have ongoing access to the registrant's products and/or services even after the relationship between the registrant and the developer has been otherwise terminated.

The present system and method is configured to facilitate the working relationship between registrant and developer. The system as described herein allows a registrant and developer to work together to ensure that a correct set of products and services are purchased as part of the registrant's online presence. The system then enables the registrant, after becoming a client of the developer, control over the access rights of the developer to those products and services (as well as other products and services registered to the registrant), which ensures the developer has sufficient access to the products and services to effectively work on behalf of the registrant to develop the registrant's online presence.

FIG. 1 is a block diagram illustrating an example environment in which the present system and method may be implemented. As shown, environment 100 includes host 102 configured to communicate with a number of different entities via a communications network 104. Communications network 104 may include the Internet, a public switched telephone network, computer networks (e.g., an intranet, an extranet, a local-area network, or a wide-area network), wired networks, wireless networks, and the like.

Host 102 makes available a number of different products to customers 106 to allow customers 106 to create and manage their online presence. For example, host 102 may provide domain name (DN) registration services 108 that enable a user to search for and register a desired domain name. Host 102 may also provide hosting services 110 allowing a user to host website content with host 102 as well as a website builder 112 tool enabling a user to modify and create content for a website that may be hosted on hosting services 110.

Host 102 may provide a number of other products that can be utilized in conjunction with a website hosted on hosting services 110, such as SEO services 114 and shopping cart 116 functionality. Other types of products that may be provided by host 102, but are not illustrated in FIG. 1, include domain name transfer services, private domain name registration, domain name system (DNS) services, secure communications certificate creation and management (e.g., secure socket layer certification creation), email services, logo design services, and marketing solutions (e.g., local service business listing services, restaurant menu management).

Host 102 stores customer records in user account records database 118 to maintain a listing of which products or services have been purchased by a particular customer 106. During normal use, a customer would create an account with host 102 and then register one or more of the products provided by host 102. Once a product is registered, the customer can access the product to create and modify settings associated with the product, upload content to the product, and modify various attributes of the product.

A front of site 120 website is provided by host 102 enabling a customer 106 to authenticate to host 102 and then access and/or purchase one or more of the products or services offered by host 102.

In the present system, customer 106 may elect to delegate some responsibilities to developer 122 to access and modify one or more of the products that have been purchased by customer 106. Once delegated to, developer 122 authenticates to front of site 120 website and can then access the one or more products or services of customer 106 to which the developer 122 has been granted access. Generally, when acting as delegate, developer 122 may be said to be impersonating customer 106 so that when viewing one of the products that customer 106 has registered, developer 122 sees generally when customer 106 would see when viewing the product.

Depending upon the permission level granted to developer 122 by customer 106, as part of the delegation developer 122 may only be able to access or view a particular product and the contents thereof or may, in some cases, have the rights to access a product and make changes therein or even delete or remove the product. As such, the delegation may allow developer 122 to modify one or more of the products of customer 106 on behalf of customer 106.

When the products of customer 106 have been appropriately configured by either customer 106 or developer 122 (which may involve creating settings for the various products, or uploading or creating content in one or more of the products), content associated with the products can be published by host 102 and accessed by public users 124 via network 104.

In the present system, before working with customer 106, developer 122 creates a developer account with host 102. FIG. 2 is a screenshot illustrating an example form 200 that may be completed by a developer to register as a developer with host 102. Form 200 may be displayed on a suitable website by host 102 enabling developer 122 to create a developer account with host 102.

As shown, form 200 allows a developer to both create an account and provide information describing the developer. For example, the developer may upload a logo 202 to be incorporated into communications transmitted by host 102 on behalf of developer 122. The logo may be uploaded as a still graphic image or may include animation or video. Developer 122 can also provide identifying information such as the developer's name and business name. Form 200 may also be used by developer 122 to supply contact information, such as email address 208 and telephone number 210.

In other embodiments, when developer 122 is creating an account, form 200 may be modified to capture more or different data about developer 122's business. For example, form 200 may capture information such as a description of the services offered by developer 122 as well as prices (or estimates of prices) for the same. Additionally, information such as the location of developer 122 could be captured by form 200 enabling potential customers 106 in proximity to developer 122 to be identified, where the proximity may enable or facilitate in-person meetings between developer 122 and a customer 106.

After developer 122 has created an account with host 102, the information submitted through form 200 is captured by host 102 and stored in an appropriate data storage system (e.g., user account records database 118 of FIG. 1) and may be utilized to provide customers 106 of developer 122 with a consistent branding experience for all communications initiated to customers 106 by host 102. This may involve, for example, always displaying developer 122's company name and logo in all communications transmitted by host 102 on behalf of developer 122 so that the developer 122's brand is regularly displayed to the customers allowing developer 122 to develop some brand loyalty with customers of developer 122.

After developer 122 has provided all the information requested by form 200, developer 122 clicks button 212 to initiate the creation of a developer account. At that time, host 102 receives all of the information that developer 122 entered into form 200 (including, optionally, a logo for developer 122). That information can then be stored in a suitable database (e.g., user account records database 118) by host 102 for later retrieval.

Figure 3:
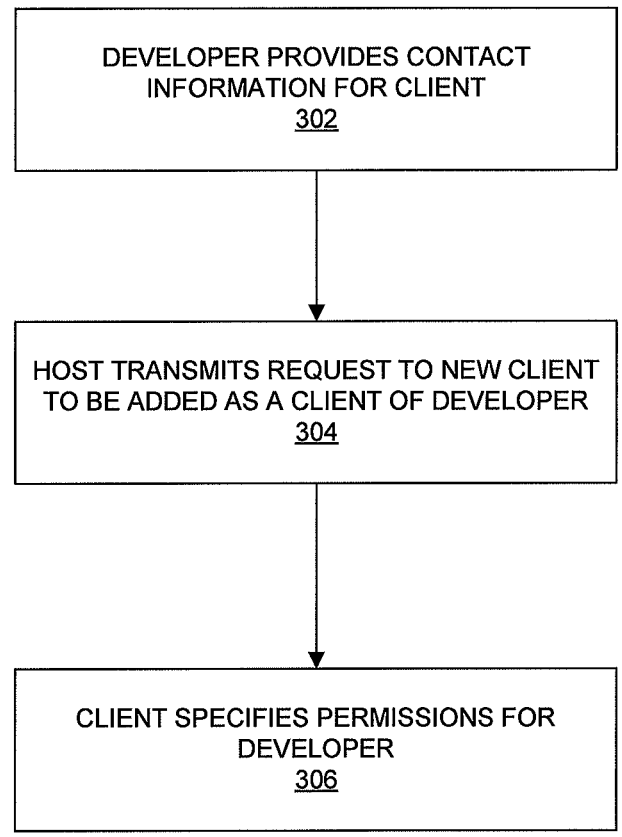
FIG. 3 is a flowchart illustrating an example method for a registered developer to add a client.

After developer 122 has created a developer account with host 102, developer 122 can add one or more customer 106 as a client of developer 122. FIG. 3 is a flowchart illustrating an example method for a registered developer 122 to add a client.

Referring to FIG. 3, in step 302 developer 122 provides contact information for the new client. In some cases, the new client may already be a customer 106 of host 102, however in other cases the new client will not be a customer 106 and may, therefore, ultimately need to create a new customer account with host 102.

In many cases, developer 122 will have already met the individual or team that is to become the new client. For example, following an interview process (either formal or informal), developer 122 and the new client may determine that they wish to work together. At that time, the new client may provide the developer 122 with contact information (e.g., by sharing a business card or social network contact information) enabling the developer 122 to add the client as a new client according to the present method.

Figure 4A:
FIGS. 4A-4E are screen shots depicting various steps in a method for a registered developer to add a client and receive notification of the same.

FIG. 4A shows an example user interface enabling developer 122 to provide contact information for the potential new client. The interface enables developer 122 to provide contact information for the new client, including name and email address. The form also provides an option to allow developer 122 to add products on behalf of the new client (see button 401). This option is described in detail below.

Returning to FIG. 3, after developer 122 has provided the contact information for the new client, in step 304 host 102 receives the contact information and transmits a request to the client. The request asks that the client confirm that they wish to be added as a client of developer 122. At this time, the client is put into a pending state.

Figure 4B:
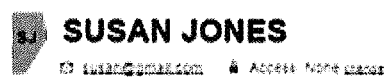

FIG. 4B shows an example user interface that may be displayed to developer 122 to show that a new client invite has been sent (e.g., following completion of step 304 of FIG. 3). As shown, the user interface shows that the account is pending (i.e., the new client has not become a formal client of developer 122) and that, at this time, developer 122 has no access to any of the products or services of the new client. As such, the account access is pending. The potential new client will stay in this state (with developer 122 having no access) until the request is accepted by the new client and account access is granted.

Figure 4C:
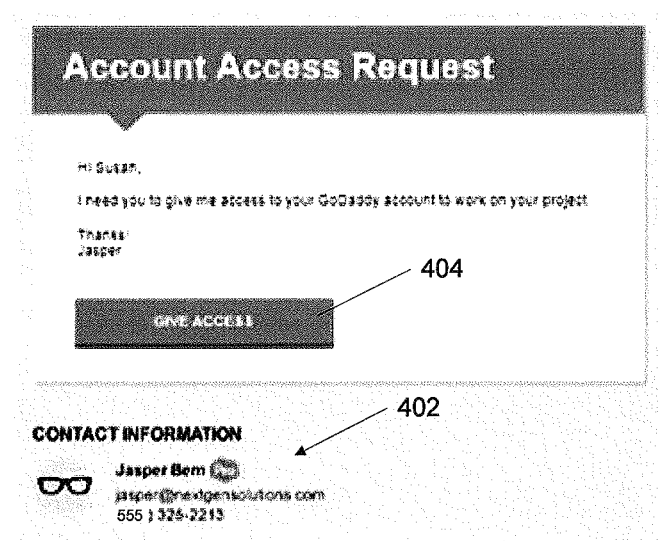

FIG. 4C shows an example message that may be transmitted to the new client upon completion of step 304 of FIG. 3. As illustrated, the message identifies the developer 122 that has caused the request to be issued—the request includes the developer 122's contact information, and logo 402 and requests that developer 122 be given access to the potential new client's products with host 102.

If the potential new client wishes to become a client of developer 122, the new client clicks upon button 404. After clicking button 404 the user will be asked to authenticate to host 102 (e.g., by providing a username and/or password).

In the event that the new client is not already a customer of host 102, the new client, after clicking button 404 may elect to create a new customer account with host 102. During the new customer account creation, the new client will provide a username and password that will be used to authenticate the new client to host 102 in the future.

After authenticating with host 102, as shown in step 306 of FIG. 3, the new client will be provided with an opportunity to become a client of developer 122 by specifying a set of permissions for developer 122.

Figure 4D:

In one embodiment, the client may be able to set relatively simple permissions for developer 122. For example, the client may only be able to select between giving developer 122 access to manage all of the products to which the user has subscribed with host 102, or permission to both manage those products as well as purchase new products on behalf of the user. An example of such a user interface is shown in FIG. 4D. As illustrated, the interface includes radio buttons 406, which allow the user to select between the two permission options that will be granted to developer 122.

With reference to FIG. 4D, after the user has selected the desired permission options, the user selects button 407 to set the desired permissions (the permissions may be stored by host 102 in a suitable data storage device, for example) and cause a notification to be transmitted to developer 122 informing developer 122 that the user has set a permission level for developer 122. At that time, the user will be transitioned into an active client of developer 122 and developer 122 will have access to the user's purchased products and, depending upon the permission level granted, can begin working to modify and update those products to develop the user's web presence. If the user give developer 122 permission to make purchases on behalf of the user, the user may specify a monetary limit that developer 122 cannot exceed in making such purchases. In one embodiment, the user may be able to grant developer 122 permission to all aspects of the user's account with host 102. Such a grant of permissions would allow developer 122 to update he user's personal information such as name and telephone number as well as payment information. To provide adequate security, this permission level may be limited temporally to prevent abuse or misuse. In other cases, the user may grant permissions to developer 122 to manage the user's stored payment information. This could be useful to allow developer 122 to take the steps necessary to ensure that product renewals take place as necessary.

In other embodiments, the system may allow the user much more control over the permissions that are to be granted to developer 122. For example, the user may be able to specify different specific sets of permissions (e.g., create, modify, and/or delete) for each product to which the user is a subscriber. Because different actions may be associated with different products, the available types of permissions may vary for different products. For example, for a website builder application, the permissions may center on whether the developer has the ability to modify existing content, create new content, or delete content. In some cases, the option to delete content may be further delineated so that the client can specify whether the developer can only delete content that the developer has created, or whether the developer can delete additional content (e.g., content created by the client his or herself). The set of permissions that may be available for hosting services, in contrast, may include whether the developer has the ability to take down an instance of the client's website or purchase a new instance. Table 1, below, shows an example set of permission options for a particular user in such an implementation for various different products.

TABLE 1

| Product | Possible Permissions |
|---|---|
| Website Builder Application | create, modify, and/or delete content |
| SEO services | create, modify, and/or delete settings |
| DNS Services | create, modify, and/or delete records |
| Hosting Services | Take down an instance and/or purchase a new instance |

In some cases, the permissions may be granted for a limited time so that any permission given to developer 122 will expire.

Figure 4E:
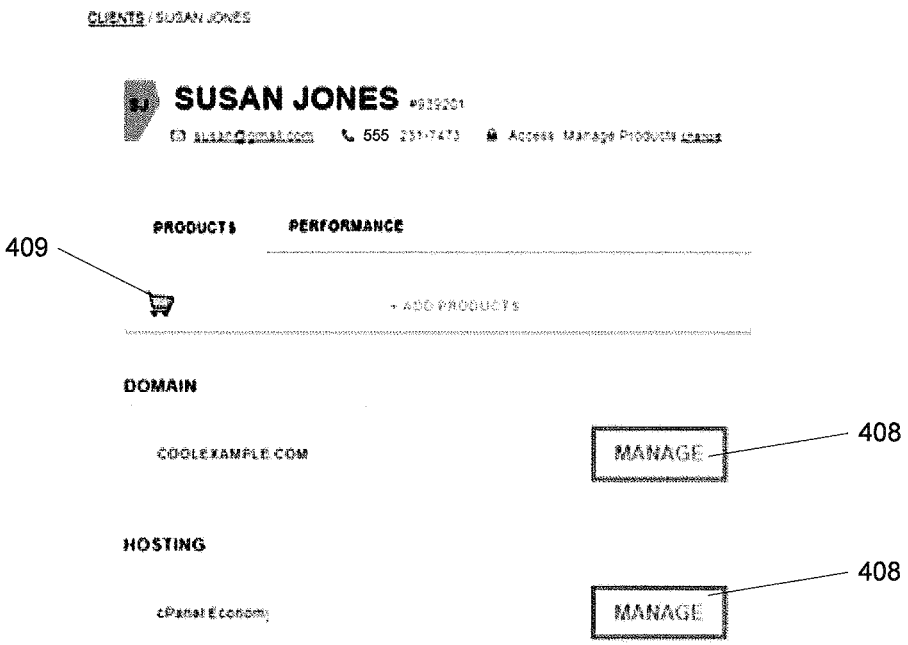

With permissions delegated to developer 122, the client will appear as an active client in the dashboard of developer 122. To illustrate, FIG. 4E is a screenshot showing an example dashboard for developer 122 following the grant of permissions by a client. As shown in FIG. 4D, the client (in this example, Susan Jones) has subscribed to two products—domain name and hosting. By selecting one of buttons 408, developer 122 can access either of the client's products to make changes thereto in accordance with the permissions that were granted by the client.

In another embodiment, in addition to specifying specific permission levels for developer 122, the client can also specify the form in which the developer must authenticate to host 102 before being given access to the client's products. The form of authentication may be established generally for all of the client's products or may be established on a product-by-product basis. In another embodiment, specific forms of authentication may be established for certain actions that developer 122 may taken within one or more of the client's products.

For example, a normal single-factor authentication may be required to allow developer 122 to access the client's website builder account and make modifications to the user's website. However, if developer 122 wishes to delete the user's website (or even just one or more web pages of the user's website), a two factor authentication may be required before such an action may be implemented. Similarly, single factor authentication may be required before developer 122 can purchase new domain names on behalf of the user. However, if developer 122 attempts to transfer one of the user's registered domain names out of the user's name to another entity, such an action may require two factor authentication before the transfer can be implemented.

In a basic implementation, developer 122 would be required to authenticate as developer 122 before being given access to the user's products. This could involve, for example, developer 122 supplying the user name and password associated with the developer 122's developer account established with host 102.

In other embodiments, the client may choose to specify that the developer 122 be required to authenticate to host 102 using two factor authentication. In that case, not only must developer 122 supply a password in order to be authenticated, but developer 122 may also be required to supply a second factor (e.g., a second token) in order to be granted access to the client's products. This may involve, for example, developer 122 being required to provide to host 102 a token or code that has been previously transmitted to the developer 122's smart phone via short messaging service (SMS) message. In other cases, the second factor may be a biometric token, such as a fingerprint of developer 122 (e.g., submitted to host 102 via an appropriately configured fingerprint scanner), and iris scan of developer 122 (e.g., submitted to host 102 via an appropriately configured iris scanner), or a photograph of the developer 122 (e.g., submitted via an image or photograph captured via a camera capability of a smart phone belonging to developer 122). In other embodiments, more than two factor authentication may be required so that developer 122 may be required to supply three or more security tokens to host 102 before being granted access to the user's products.

When using multi-factor authentication, developer 122 may be required to provide all the tokens required as part of the authentication scheme. For example, developer 122 may be required to provide a password, a token that was supplied via SMS message to developer 122's mobile device, fingerprint data, and any other token that may be used for authentication.

Figure 5:
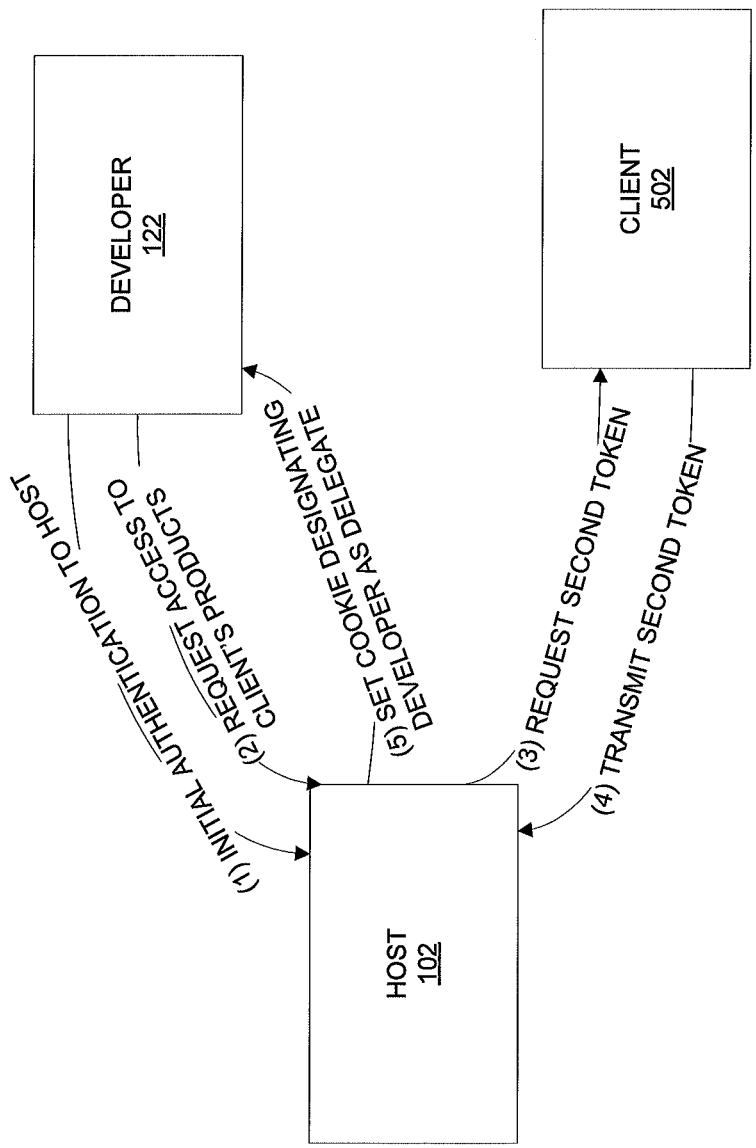
FIG. 5 is a block diagram illustrating a multi-factor authentication scheme for a developer where a client is required to provide at least one of the authentication tokens.

In other embodiments of a multi-token authentication scheme, the tokens may be required to be provided by both developer 122 and the client, before developer 122 can be authenticated and given access to the user's products. For example, FIG. 5 is a block diagram illustrating a multi-factor authentication scheme for developer 122 where a client is required to provide at least one of the authentication tokens. FIG. 5 includes a simplified version of the environment illustrated in FIG. 1. As illustrated, the environment includes host 102 and developer 122. In this example developer 122 has a client 502. Client 502 has given permission to developer 122 to access client 502's products. But, in giving that permission, client 502 has specified that developer 122 will need to authenticate using two factor authentication, where the second token in the authentication scheme must be provided to host 102 by client 502 rather than developer 122 because any such access is granted.

Under such a scheme, developer 122 may first authenticate to host 102 via a conventional authentication scheme (e.g., by providing a user name and password, and, optionally, providing secondary authentication factors) as indicated by arrow (1). Developer 122 may authenticate in this manner specifically to access the products of client 502. Or, alternatively, developer 122 may simply authenticate in this manner in order to access developer 122's own account or to access the products of another client.

At some point after the initial authorization, however, as indicated by arrow (2), developer 122 wishes to access the products of client 502. Note that developer 122 has previously received permission from client 502 to access the products of client 502.

Upon receiving the request from developer 122, host 102 accesses the permission record that was created by client 502 for developer 122. The permission record may be stored, for example, in an authentication database that is part of or separate from user account records database 118 depicted in FIG. 1 and describes the permissions that were granted to developer 122 by client 502. In the present example, because the permission record indicates that two-factor authentication is to be implemented, with the second factor being provided by client 502, host 102 transmits a request for the second token to client 502, as indicated by arrow (3).

The step indicated by arrow (3) may be implemented in any suitable manner. In one example, host 102 is configured to transmit a text token to a mobile device belonging to client 502. An example message may be, for example "Your validation code is ######. This code will expire in 20 minutes." The code could include, for example, a combination of letters and numbers. Upon receiving the text token, client 502 responds to host 102 either by entering the token into a web page provided by host 102, by transmitting the token back to host 102 via SMS message, or using any other suitable technique.

By providing the token back to host 102 (see arrow (4)), client 502 is required to be part of the two-factor authentication process by which developer 122 accesses client 502's products. This ensures that developer 122 is not accessing client 502's products without the knowledge of client 502. Additionally, in cases where client 502 and developer 122 have not worked together in sometime, this two-factor authentication scheme can act as a reminder to client 502 that client 502 had previously delegated permission to developer 122, should developer 122 try to access client 502's products at a later date.

This scheme, therefore, provides a secure authentication approach that ensures client 502 is made aware when developer 122 is accessing client 502's products.

In some embodiments, developer 122 may be given temporary access (which may optionally be limited to read-only access) to the account of client 502, while the system waits for client 502 to provide the second token. This would allow developer 122 to perform some work within the account of client 502 even if client 502 takes some time to provide the necessary token. In such an implementation, any changes that developer 122 attempts to make to the account of client 502 could be held temporarily and not implemented until client 502 provides the security token, at which time the changes would be implemented.

Although this authentication scheme is described in terms of client 502 delegating web development responsibilities and permissions to a developer 122, it should be understood that this two-factor authentication scheme may be utilized in any situation calling for authentication of a first individual or entity where it is beneficial that a second individual or entity be made part of (and, thereby, aware of) the first individual or entity's attempt to authenticate to a particular system.

In some embodiments, rather than transmit a request for a second token to client 502, a notification that developer 122 has accessed one of the products of client 502 may be transmitted to client 502. In such an implementation, there would be no delay for developer 122 to access the products of client 502 while the system waits for client 502 to return the security token. In any case, client 502 would be made aware that developer 122 is accessing client 502's account and, if that access is not desired, client 502 could take suitable steps to revoke developer 122's access.

In a similar manner, rather than require that client 502 provides the security token, client 502 could instead be provided with a notification of proposed changes being made to client 502's account. Upon review of those proposed changes, client 502 could elect whether to approve or disapprove of the changes being made. If approved, the changes, which would otherwise be held temporarily, would be implemented. If not approved, the changes would be discarded resulting in no modification to client 502's account.

After developer 122 has been authenticated using the form of authentication that was specified by the user, developer 122 can be designated as a delegate of the client 502. Accordingly, as illustrated by arrow (5) in FIG. 5 a cookie (which may, in various embodiments, be a secure cookie) may be set on a computing device of developer 122 that indicates developer 122 is a delegate of client 502. As developer 122 navigates through websites and products made available by host 102, the secure cookie will provide developer 122 with access to the products of client 502 in accordance with the permissions granted by client 502.

In various embodiments of the present system, developer 122 may shop for products on behalf of a client. As discussed above, because developer 122 has particular knowledge of the products needed by the client—a knowledge that may not be accessible to the client—it may facilitate developer 122's work to allow developer 122 to shop on behalf of the client.

In the present system, developer 122 is able to browse through the various product offering of host 102 and select one or more of the products to create a shopping list. Once created, that shopping list can be forwarded to the client of developer 122 with a notification that the shopping list was prepared by developer 122 for the client.

Upon receipt, the client can review the shopping list and choose to purchase the items on the shopping list as is, or to make modifications to the order before purchasing.

If the client is not yet a formal client of developer 122 (i.e., the client has not yet granted permission to developer 122 to the client's products with host 102), upon approving of the shopping list, the client may choose to grant permission to the various items being purchased pursuant to the permission options described herein.

Following purchase of the items (and, potentially, the granting of permission to the items to developer 122) developer 122 receives a notification letting developer 122 know that they can access the client's products.

Figure 6:
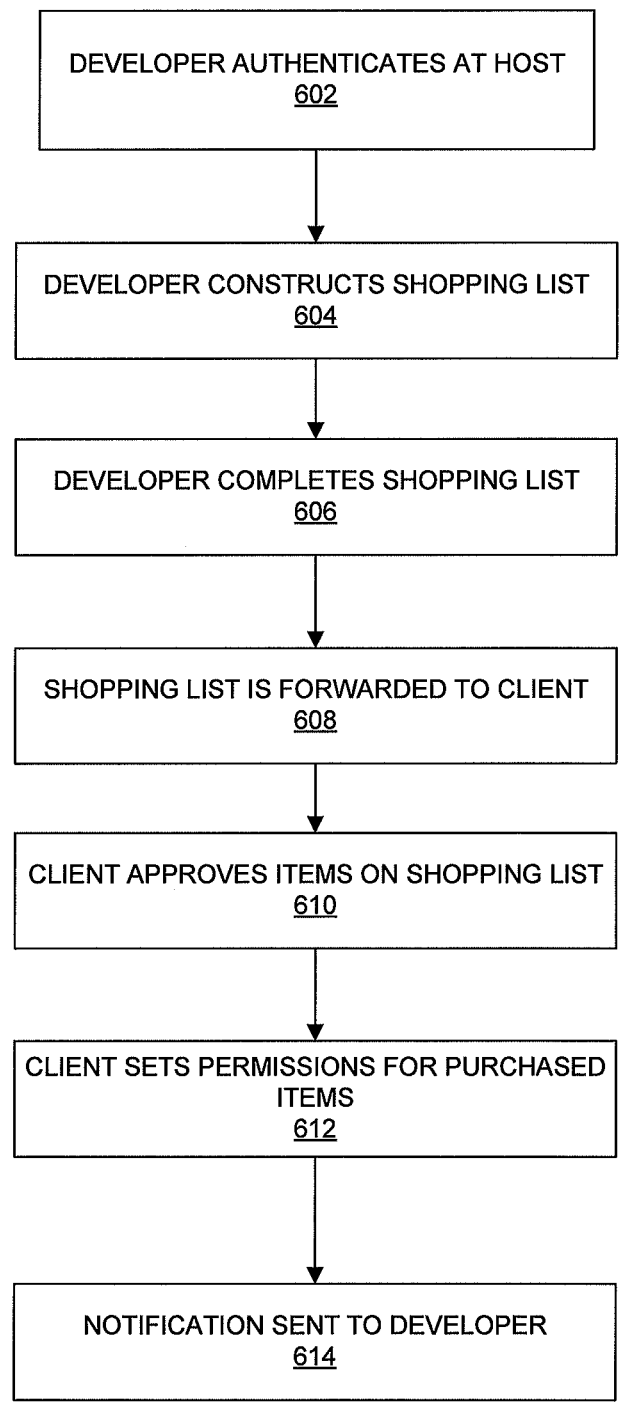
FIG. 6 is a flowchart illustrating a method for a developer to shop for products on behalf of a client.

FIG. 6 is a flowchart illustrating a method for developer 122 to shop for products on behalf of a client. In step 602, developer 122 authenticates to a website hosted by host 102. This allows host 102 to know the identity of developer 122 as developer 122 constructs the shopping list.

In step 604, developer 122 browses the available products in a catalog of products made available by host 102. While browsing, developer 122 selects one or more products to add to a shopping list for a particular client. In selecting the one or more products, developer 122 may make selections of particular attributes of the various products depending upon the needs of the client of developer 122.

In step 606, developer 122 completes the shopping list. At this time, host 102 receives the contents of the shopping list and stores the listing (along with all product-specific purchase details) in a storage database (e.g., shopping list database 126 of FIG. 1). The database entry containing the shopping list is associated with developer 122 (e.g., by including an identification code associated with developer 122 in the database entry). The shopping list is also allocated a key (e.g., an ID number that uniquely identifies the shopping list) that may be used to identify and retrieve the contents of the shopping list from the storage database.

At this time, a client for the shopping list may be identified. If, for example, developer 122 created the shopping list by navigating through the dashboard of the developer 122 and selecting a button to shop on behalf of a particular client (see, for example, button 409 of FIG. 4E) or as part of creating a new client for developer (see, for example, button 401 of FIG. 4A), the client may be identified implicitly by the actions of developer 122. If it is not possible to implicitly identify the client for whom developer 122 has been shopping, host 102 may explicitly prompt developer 122 to provide an identification of the client (e.g., name and email address) for whom developer 122 has been shopping.

In step 608, after identifying the client for whom developer 122 has been shopping, host 102 creates an electronic message to be transmitted to the client (e.g., an email message, email message containing a link to a web page, web age, SMS message, and the like) that notifies the client that developer 122 has created a shopping list for the client. The message may include a link to the shopping, where the key that was originally associated with the shopping list when it was stored in shopping list database is encoded into the link. An example link containing the key is depicted in Table 2, below, where the key includes the string "44." The message may include an identification of developer 122 that created the shopping list, which may include developer 122's name, business name, and logo.

TABLE 2 https://pro.godaddy.com/shopping_list/44/accept?&isc=gdbb3043&ci=95067&cvosrc=bounceback.3043.gdbb3043

Figure 7A:
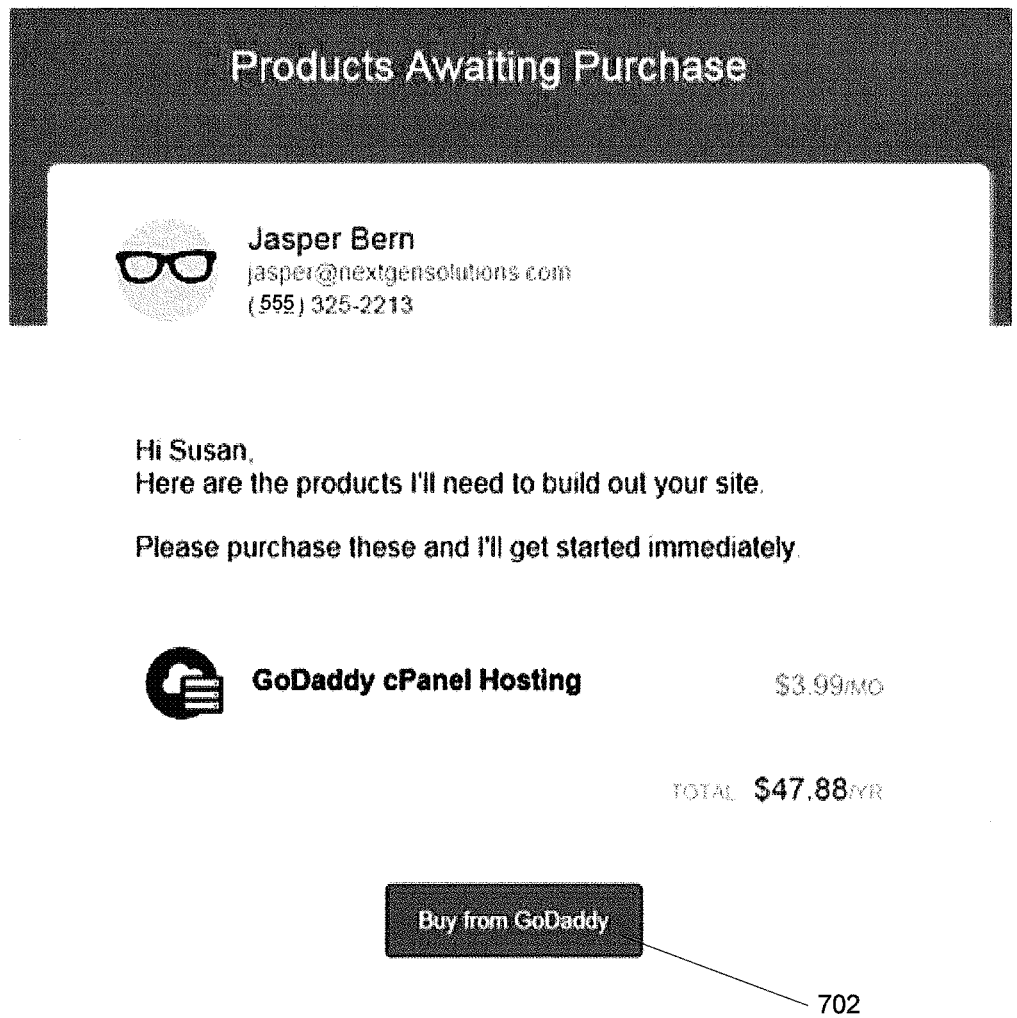

In one embodiment, the electronic message transmitted to the client may include a summary of the items that developer 122 has included in the shopping list. To illustrate, FIG. 7A is a screen shot of an electronic message that may be transmitted to a client to inform the client of a shopping list that has been created on their behalf. As illustrated in FIG. 7A, the message includes a summary of the products that were added to the shopping list, as well as an indication of developer 122, including developer 122's logo and business information.

The user interface includes a link 702 that, when executed, allows the client to review the details of the shopping list and make a determination of whether the client wishes to purchase the items on the shopping list.

After the user executes link 702, host 102 receives the indication that the link has been executed and retrieves the key that was originally embedded into the link from the executed link. Host 102 can then use the key to retrieve the details of the shopping list from shopping list database 126. Having retrieved the details of the shopping list, host 102 creates a user interface such as that depicted in FIG. 7B for the client providing the client with a detailed summary of the items contained in the shopping list.

Figure 7B:

In one embodiment, the level of details included in the user interface of FIG. 7B may vary depending upon whether the shopping list was created by developer 122. If so, the user interface created by host 102 may be simplified and provide a simple summary of the items contained within the shopping list. Such an interface may include limited cross-selling/upselling of other products so as to minimize confusion for the client and to prevent the user from purchasing incorrect items. In one embodiment, host 102 can determine whether the shopping list was created by developer 122 by determining whether the database entry containing the shopping list includes an association with developer 122.

In step 610, after reviewing the items contained in the shopping list (and, optionally, modifying the list of items contained therein), the client approves of the items on the shopping list and initiates a transaction for purchase of the same. Because the shopping list was originally prepared by developer 122, after purchasing the items, in step 612 the client is provided an opportunity to set the permissions granted to developer 122 for the items newly purchased.

FIG. 7C is a screenshot showing an example user interface enabling the client to select particular permissions levels for products that were purchased using a shopping list created by a developer. As illustrated, the interface includes a number of radio buttons 704 enabling the user to select between different permissions levels for the recently-purchased products. In accordance with the various embodiments described herein, at this point the client may be provided with many different options regarding the permissions to grant to developer 122 for each of the listed products. For example, the client may be able to specify particular levels of permissions for each product purchased independently of one another. Furthermore, the client may be able to specify a particular form of authorization (e.g., single factor authentication, multi-factor authentication, or multiple factor authentication where one factor is provided by the client) for each of the client's products and may even specify a particular form of authorization that must be undertaken by developer 122 before developer 122 can take particular actions in one or more of the client's products.

Returning to FIG. 6, following the client's setting of permissions for developer 122, in step 614 a notification is sent to developer 122 informing developer 122 that products have been purchased based upon the shopping list originally sent to the client and that developer 122 may now have access to the one or more products.

The steps included in the embodiments illustrated and described in relation to the various figures are not limited to the embodiments shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising:
receiving, by a computer server configured to communicate via a communications network and from a first user, a request to access a first computing resource of the computer server;
prompting, by the computer server, the first user to supply a first authentication credential for access to the first computing resource of the computer server;
receiving, by the computer server, the first authentication credential from the first user;
after receiving, by the computer server, the first authentication credential, receiving, from the first user, a request to access a second computing resource of the computer server;
accessing, by the computer server, an authentication database to identify a second user associated with the second computing resource;
transmitting, by the computer server, to the second user a request for a second authentication credential
receiving, by the computer server, at least one permission or access right granted by the second user to manage, configure or purchase at least one development resource operated by the first user; and when the second authentication credential is received from the second user, granting, by the computer server, the first user access to the second computing resource.

2. The method of claim 1, wherein the request for the second authentication credential is transmitted to the second user using a short message service message.

3. The method of claim 1, wherein the second authentication credential includes an image.

4. The method of claim 1, wherein the second computing resource includes a product registered to the second user.

5. The method of claim 4, wherein the product includes at least one of a website builder application, a search engine optimization tool, and an email service.

6. The method of claim 1, wherein the first user is a delegate of the second user.

7. The method of claim 1, including, after receiving from the second user the second authentication credential:
    accessing the authentication database to determine a permission level of the first user for the second computing resource; and
    restricting actions of the first user with respect to the second computing resource in accordance with the permission level.

8. The method of claim 1, including, after receiving from the second user the second authentication credential, setting a secure cookie on a first user device of the first user, the secure cookie indicating that the first user is a delegate of the second user.

9. A method, comprising:
    receiving, by a computer server configured to communicate via a communications network and from a first user, a request to access a computing resource of the computer server;
    accessing, by the computer server, an authentication database to identify a second user associated with the computing resource;
    transmitting, by the computer server, to the second user a request for an authentication credential; and
    receiving, by the computer server, from the second user the authentication credential; and
        at least one permission or access right granted by the second user to manage, configure or purchase at least one development resource operated by the first user.

10. The method of claim 9, wherein the request for the authentication credential is transmitted to the second user using a short message service message.

11. The method of claim 9, wherein the authentication credential includes an image.

12. The method of claim 9, wherein the second computing resource includes a product registered to the second user.

13. The method of claim 12, wherein the product includes at least one of a website builder application, a search engine optimization tool, and an email service.

14. The method of claim 9, wherein the first user is a delegate of the second user.

15. The method of claim 9, including, after receiving from the second user the authentication credential:
    accessing the authentication database to determine a permission level of the first user for the computing resource; and
    restricting actions of the first user with respect to the computing resource in accordance with the permission level.

16. The method of claim 9, including, after receiving from the second user the authentication credential, setting a secure cookie on a first user device of the first user, the secure cookie indicating that the first user is a delegate of the second user.

17. A system, comprising:
    an authentication database associating at least one user with at least one computing resource; and
    a computer server configured to communicate with the authentication database, the computer server being configured to:
        receive, from a first user, a request to access a computing resource,
        access the authentication database to identify a second user associated with the computing resource,
        transmit, to the second user, a request for an authentication credential, and
        receive, from the second user:
            the authentication credential; and
            at least one permission or access right granted by the second user to manage, configure or purchase at least one development resource operated by the first user.

18. The system of claim 17, wherein the request for the authentication credential is transmitted to the second user using a short message service message.

19. The system of claim 17, wherein the authentication credential includes an image.

20. The system of claim 17, wherein the second computing resource includes a product registered to the second user.

* * * * *